Aug. 3, 1937.                    R. F. GOUDEY ET AL                    2,089,162
PROCESS FOR CONCENTRATING ACTIVATED SEWAGE SLUDGE
Filed May 15, 1933
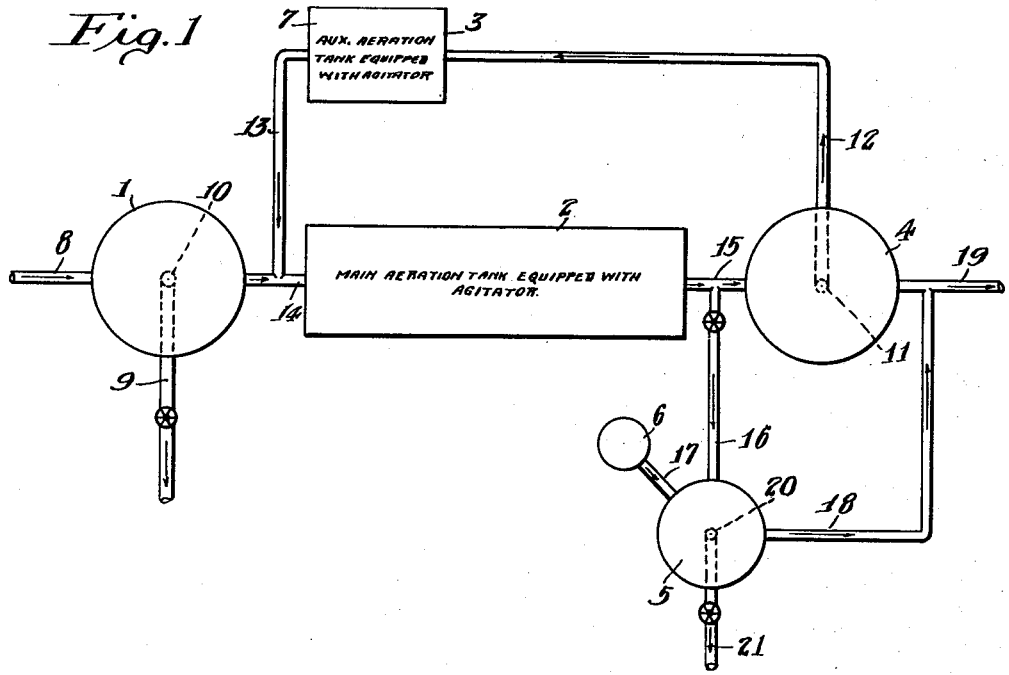
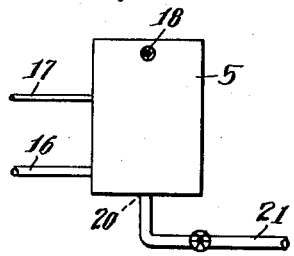
Inventor
Raymond F. Goudey
Schuyler M. Bennett
By
Lyon & Lyon
Attorneys Patented Aug. 3, 1937

2,089,162

UNITED STATES PATENT OFFICE 2,089,162

PROCESS FOR CONCENTRATING ACTIVATED SEWAGE SLUDGE

Raymond F. Goudey and Schuyler M. Bennett, Los Angeles, Calif.

Application May 15, 1933, Serial No. 671,135

4 Claims. (Cl. 210—8)

This invention relates particularly to methods of treating sewage and more particularly to the concentration of what is known in the art as "activated sludge".

A more specific object is to shorten the time required to concentrate the excess activated sludge that is produced during the process and that requires separate treatment and disposal.

Still another object is to provide a practical method of concentrating activated sludge to a greater degree than has hitherto been obtained and at less cost than by prior methods.

Other objects and advantages will be apparent from the detailed description of the process of the invention which will be given later.

In accordance with the activated sludge method of treating sewage, the raw or settled sewage is acted upon by certain bacteria, enzymes, catalysts, etc., while being agitated in the presence of air at a suitable temperature. As a result of this action, a large part of the solids present in the sewage is reduced to liquids, leaving a flocculent residue known as activated sludge. This activated sludge is then separated from the clear liquid. A partial separation may be readily obtained by gravity separation in settling tanks, the sludge settling to the bottom so that clear effluent may be drawn off at the top of the tanks. However, the sludge that settles to the bottom still contains a very large amount of water and the hitherto known methods of further de-watering this dilute sludge were relatively expensive.

In accordance with the present invention we have discovered that if, instead of taking the excess activated sludge, which must be removed, from the bottom of the main settling tank or tanks of the activated sludge process, a volume of the dilute aeration tank liquid containing the same weight of dry solids is removed to a separate tank and settled in the presence of chlorine, better results are obtained. The specific advantages are that the sludge obtained is more compact and concentrated and is generally less troublesome to handle. Best results are obtained when the liquid from the aeration tank is introduced near the bottom of the settling tank and chlorine is added to the clear water in the upper portion of the tank which has separated from the sludge. The effect is to maintain a blanket of chlorinated water above the concentrated sludge accumulating in the bottom of the tank. The sludge stays down for a long period and does not have a tendency to rise as it does in the previously known settling methods. Activated sludge concentrated in accordance with our method is much drier and correspondingly less bulky than that obtained by other known practicable methods and may be further treated for final disposal at much less expense.

In the drawing:

Figure 1 is a diagrammatic plan view of a sewage treating system in which our process may be employed; and Figure 2 is an elevational view of the activated sludge settling tank shown at 5 in Figure 1.

In Figure 1 of the drawing the circles 1, 4 and 5 represent settling tanks or clarifiers, as they are commonly termed, and the rectangles 2 and 3 represent aeration tanks for treating sewage by the activated sludge process.

The clarifiers 1, 4 and 5 are preferably provided with mechanical scraping devices such as Dorr mechanisms for working the sediment or sludge that settles by gravity to the floors of the clarifiers to the centers of the floors from which points it may be discharged either intermittently or continuously through the bottom openings indicated at 10, 11 and 20, respectively, into discharge pipes 9, 12 and 21, respectively.

The aeration tanks 2 and 3 are preferably provided with jets for supplying compressed air to the contents and with agitators for keeping the contents in motion and thoroughly mixing them to promote the chemical and biological action which breaks down the solid matter in the sewage into liquids and a residue of activated sludge.

The units of the equipment that have been mentioned may be of old and well known types that have been used before for sewage treatment. For that reason, it is unnecessary to describe their construction in detail.

Briefly, the system functions as follows:

Raw sewage is continuously supplied through an inlet pipe 8 to the clarifier 1 where the readily settleable solids drop to the bottom as fresh sludge and are withdrawn from time to time through the discharge aperture 10 and pipe 9 and are disposed of in any desired manner.

The effluent from clarifier 1, containing only those solids that do not readily settle out is continuously withdrawn from the top of the clarifier 1 and delivered through a conduit 14 into the main aeration tank 2. It is to be understood, however, that the clarifier 1 may be dispensed with and the raw sewage fed directly to the aeration tank 2. As the raw or settled sewage is delivered into the aeration tank 2, it is mixed with activated sludge which is continuously admitted through a conduit 13 into the conduit 14. This activated sludge entering through conduit 13 is thoroughly mixed with the raw or settled sewage in the aeration tank 2 and is retained in tank 2 for a sufficient length of time to permit completion of the bacteriological and chemical processes which convert the solids in the sewage into liquids and excess activated sludge. The necessary time of retention in the aeration tank 2 is obtained by suitably proportioning the dimensions of this tank relative to the rate of flow of sewage thereinto. A constant level is maintained in the aeration tank 2 by continuously withdrawing from the outlet end of the tank through a conduit 15 a volume of treated sewage (consisting of a mixture of clear effluent and activated sludge) equal to the total volume of sewage and activated sludge which is continuously entering the tank. The greater part of this out-flow from tank 2 is fed into a clarifier 4 in which the activated sludge settles out of the clear liquid to the bottom and the clear effluent is constantly discharged from the top of the clarifier through a conduit 19.

It is necessary in order to maintain the desired bacteriological and chemical processes in tank 2 to maintain therein a relatively high concentration of activated sludge and to maintain intimate contact of the sewage with the activated sludge. To this end the activated sludge, which continuously settles to the bottom of the clarifier 4, is continuously withdrawn therefrom through a pipe 12 and delivered to an auxiliary aeration tank 3 in which the sludge is revived to restore the active bacteriological elements therein to maximum potency before being delivered through the conduit 13 into the conduit 14 where it is mixed with the sewage and re-introduced into the main aeration tank 2.

Obviously, if all of the activated sludge discharged from the tank 2 were continuously returned thereto, the concentration of sludge in the tank would increase indefinitely. Therefore, in order to limit the concentration of the activated sludge in tank 2 to a desired value, it is necessary to remove from the system an amount of sludge equal to the excess constantly being supplied thereto in the sewage.

This excess activated sludge that is removed from the system must be disposed of and its disposal heretofore has been a serious problem because of the fact that it is very difficult to concentrate. Thus, although the activated sludge settles sufficiently in the clarifier 4 to permit a clear effluent to be withdrawn from the top of the clarifier, the sludge that settles to the bottom is very dilute and is difficult to further dewater. It might be supposed that by diverting some of the sludge withdrawn from the bottom of the clarifier 4 into other settling tanks or clarifiers and permitting it to settle for a relatively long time, it could be concentrated to any desired extent. However, it has been found in practice that it is very difficult and expensive to further concentrate the sludge withdrawn from the clarifier 4 and that if it is attempted to effect the separation by settling for a very long period the sludge, probably because of further bacteriological action, tends to become buoyant and rise to the surface.

In accordance with the present invention, we have discovered that a relatively complete separation of the activated sludge may be obtained by withdrawing the required amount of aeration tank liquor directly from the tank 2 into a special clarifier 5 and introducing into the clarifier 5 substantial quantities of chlorine. The aeration tank liquor is preferably introduced into the side of the clarifier 5 at a point adjacent the bottom thereof, as shown in Figure 2, and the chlorine introduced at a point thereabove. We have found that, by admitting the aeration tank liquor directly to the clarifier 5 in the manner described and maintaining an excess of chlorine in the top water therein, the activated sludge settles rapidly to the bottom of tank 5 in a more concentrated form than has hitherto been obtained by any practicable method.

In the plant actually operated, the clarifier 5 was so proportioned relative to the capacity of the plant as to hold the excess activated sludge produced in one day. This sludge was, therefore, withdrawn once daily through the discharge pipe 21 and disposed of. The flow of aeration tank liquor through pipe 16 into the clarifier 5 and of the clear effluent therefrom through pipe 18 is continuous, or intermittent.

The excess chlorine passes off in the effluent passed through pipe 18 and by delivering this effluent into the main discharge conduit 19 (carrying the effluent from the clarifier 4) the effluent from the entire plant may be completely sterilized. This is of advantage as it means that all of the chlorine used to facilitate the sludge settling process in clarifier 5 is fully utilized.

We have found by actual test that the excess activated sludge may be readily concentrated to a water content of less than 95 per cent. The success of the process is apparently due to three factors:

(1) The dissolved oxygen, which the aeration tank liquor contains, maintains a high oxygen content during the settling of the sludge in the clarifier 5 and facilitates sedimentation;

(2) The chlorine in the top water prevents the sludge from rising after it has once settled;

(3) Initially settling the sludge from a mixture of relatively low concentration causes it to settle into a more compact mass than if it were settled from a more concentrated mixture. Thus, it has been discovered that if, instead of delivering aeration tank liquor directly to the clarifier 5, settled sludge from the bottom of the clarifier 4 is delivered to the clarifier 5, the same concentration of sludge in clarifier 5 cannot be obtained. Furthermore the water separated from the thick settled sludge is foul and cannot be discharged into the final effluent.

The deep inlet from pipe 16 into the clarifier 5 also has merit. Apparently the incoming aeration tank liquor containing dissolved oxygen, by continually washing over the top of the settling excess activated sludge contained in the clarifier 5, tends to compact the sludge.

In accordance with our method, the volume of the excess activated sludge has been reduced to about 2000 gallons of sludge per million gallons of sewage treated. One method used in the past to thicken excess activated sludge has been to further settle the excess activated sludge withdrawn from the bottom of the final clarifier 4. Sludge produced by that method was so bulky as to average about 10,000 gallons of sludge per million gallons of sewage treated. Still another method that has been heretofore used consisted of pumping excess activated sludge withdrawn from the bottom of the clarifier 4 into the incoming sewage to the preliminary clarifier I so that the excess activated sludge settled with the fresh sludge in clarifier I. This process, however, was found to increase the volume of the fresh sludge withdrawn from clarifier I by about 15,000 gallons per million gallons of sewage treated. It is, therefore, apparent that our new process is much more effective than those previously used.

The concentration of the activated sludge obtained in the clarifier 5 may be further increased by the addition of inert materials for the purpose of weighting down the sludge. By adding ground oyster shell, decomposed granite, magnesite and other materials, sludge having moisture content as low as 76 per cent has been obtained. In fact, sludge too thick to pump has been obtained by this treatment.

Various methods for disposing of concentrated activated sludge have been developed but such methods do not constitute a part of this invention. Suffice it to say, however, that with any of the known processes for finally disposing of activated sludge, it is highly desirable that the water content of the sludge be as low as it is practicable to obtain.

Where in the claims we refer to raw sewage, it is to be understood that the expression may refer either to sewage as it comes directly from the sewage system or from a preliminary settling tank, as distinct from sewage that has undergone bacteriological treatment.

It is to be understood that various modifications in the particular system shown may be made without departing from the invention. Thus, if desired, the fresh sludge from the bottom of the preliminary clarifier 1, or stale or partially digested sludges from other sources, may be concentrated with the excess activated sludge by introducing them into the settling tank 5, either through a separate opening therein or along with the excess activated sludge through pipe 16.

We claim:

1. The method of sewage disposal which includes aerating and agitating raw sewage in a treating tank in the presence of activated sludge to reduce the raw sewage to liquid and activated sludge, continuously removing the reduced sewage and activated sludge from the treating tank to a settling tank, discharging from the settling tank a portion of the liquid as clear effluent, recirculating the remainder of the liquid and the activated sludge from the settling tank through the treating tank, continuously supplying raw sewage to the treating tank, continuously withdrawing from the treating tank excess activated sludge in suspension, treating it with chlorine in amount in excess of that necessary to completely sterilize it, continuously settling the chlorinated mixture in a separate settling tank, and continuously withdrawing therefrom clear effluent containing an excess of chlorine and mixing it with the effluent from said first mentioned settling tank to sterilize the entire effluent from the treated sewage.

2. In a system for treating sewage by the activated sludge process, the method of concentrating excess activated sludge to be removed from the system, which comprises continuously introducing into a settling tank at a level below the top thereof a dilute mixture of activated sludge and water containing dissolved oxygen from said system, continuously introducing chlorine into said tank at a higher level, and continuously decanting effluent from the top of said tank.

3. In a system for treating sewage by the activated sludge process, which system includes a main aerating tank, means for introducing raw sewage thereinto, a main settling tank into which the treated liquid comprising water and activated sludge in suspension therein from the aerating tank is discharged, means for discharging the clear liquid from the top of the main settling tank, and means for returning the settled activated sludge from the bottom of said main settling tank to said aerating tank; means for concentrating excess activated sludge for removal from said system which comprises means for withdrawing directly from said aerating tank the requisite volume of dilute liquor containing the quantity of activated sludge to be removed, an auxiliary settling tank, means for introducing said withdrawn liquid into said auxiliary settling tank at a point spaced below the top thereof, means for continuously introducing chlorine into said tank at a higher level and means for decanting clear effluent from the top of said tank.

4. The method of concentrating sewage sludge which comprises continuously introducing into a settling tank at a point adjacent the bottom thereof a dilute mixture of sludge and water to be concentrated, continuously introducing chlorine into said tank at a higher level, and continuously decanting effluent from the top of said tank.

RAYMOND F. GOUDEY.
SCHUYLER M. BENNETT.